United States Patent
Gummalla et al.

(10) Patent No.: US 7,106,744 B2
(45) Date of Patent: Sep. 12, 2006

(54) SYSTEM AND METHOD FOR A GUARANTEED DELAY JITTER BOUND WHEN SCHEDULING BANDWIDTH GRANTS FOR VOICE CALLS VIA CABLE NETWORK

(75) Inventors: Ajay Chandra V Gummalla, Atlanta, GA (US); Dolors Sala, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 928 days.

(21) Appl. No.: 10/046,725

(22) Filed: Jan. 17, 2002

(65) Prior Publication Data

US 2002/0093912 A1    Jul. 18, 2002

Related U.S. Application Data

(63) Continuation-in-part of application No. 09/785,020, filed on Feb. 15, 2001.

(60) Provisional application No. 60/262,202, filed on Jan. 17, 2001, provisional application No. 60/262,201, filed on Jan. 17, 2001.

(51) Int. Cl.
*H04L 12/28* (2006.01)

(52) U.S. Cl. .................. 370/395.4; 370/229; 370/235; 370/468

(58) Field of Classification Search ................ 370/229, 370/230, 235, 236, 252, 253, 238, 395.4, 370/468, 470

See application file for complete search history.

(56) References Cited

U.S. PATENT DOCUMENTS 5,963,557 A * 10/1999 Eng ........................... 370/432
5,966,163 A * 10/1999 Lin et al. .................... 725/117

(Continued)

OTHER PUBLICATIONS

Cohen, R., "An efficient scheme for accommodating synchronous traffic in a cable-modem network while avoiding segmentation of asynchronous packets," *Computer Communications*, Elsevier Science Publishers BV, vol. 22, No. 5, Apr. 15, 1999, pp. 399-410.

(Continued)

*Primary Examiner*—Ricky Q. Ngo
*Assistant Examiner*—Nguyen H. Ngo
(74) *Attorney, Agent, or Firm*—Sterne, Kessler, Goldstein & Fox P.L.L.C.

(57) ABSTRACT

A system and method for guaranteeing a delay jitter bound when scheduling bandwidth grants for voice calls via a communication medium is provided. The method includes the steps of: determining the delay jitter bound; based on the determined delay jitter bound, dividing a packetization frame period into phases; assigning a voice call to one of the phases; and scheduling a bandwidth grant to the voice call during the assigned phase, thereby guaranteeing the delay jitter bound. The system includes a scheduler, where the scheduler determines the delay jitter bound, divides a packetization frame period into phases based on the determined delay jitter bound, assigns a voice call to one of the phases, and schedules a bandwidth grant to the voice call during the assigned phase, thereby guaranteeing the delay jitter bound. A dejitter buffer implements a way to provide zero jitter service, even though the packet transmission on the cable network has jitter, by delaying the packet and thus converting jitter into delay.

33 Claims, 13 Drawing Sheets

U.S. PATENT DOCUMENTS

| | | | | |
|---|---|---|---|---|
| 6,072,773 A | * | 6/2000 | Fichou et al. | 370/230 |
| 6,181,716 B1 | * | 1/2001 | Lide | 370/519 |
| 6,490,254 B1 | * | 12/2002 | Larsson et al. | 370/252 |
| 6,621,812 B1 | * | 9/2003 | Chapman et al. | 370/346 |
| 6,665,708 B1 | * | 12/2003 | Tikekar et al. | 709/215 |
| 6,882,625 B1 | * | 4/2005 | Le et al. | 370/238 |
| 6,950,399 B1 | * | 9/2005 | Bushmitch et al. | 370/236 |

OTHER PUBLICATIONS

Sater, G., "Media Access Control Protocol Based on DOCSIS 1.1," *IEEE* [online], Dec. 22, 1999 [retrieved Sep. 16, 2002]. Retrieved from the Internet:<URL:http://qrouper.ieee.org/groups/802/16/tgl/mac/contrib/802161mc-00_01.pdf, pp. 1-322.

Copy of International Search Report issued Sep. 25, 2002 for Appln. No. PCT/US02/01105, 4 pages.

* cited by examiner

US 7,106,744 B2

SYSTEM AND METHOD FOR A GUARANTEED DELAY JITTER BOUND WHEN SCHEDULING BANDWIDTH GRANTS FOR VOICE CALLS VIA CABLE NETWORK

CROSS-REFERENCE TO RELATED APPLICATIONS

The present application claims priority to provisional applications U.S. Pat. Ser. No. 60/262,202, filed Jan. 17, 2001, entitled "Dejitter Buffer at CMTS to Support Zero Jitter Voice in HFC Networks," by Gummalla et al., (SKGF 1875.0690000) (incorporated by reference in its entirety herein) and U.S. Pat. Ser. No. 60/262,201, filed Jan. 17, 2001, entitled "Voice Scheduling Algorithms," by Sala et al., (SKGF. 1875.0470000) (incorporated by reference in its entirety herein).

The present application is a continuation-in-part application to non-provisional application U.S. Pat. Ser. No. 09/785,020 filed Feb. 15, 2001, entitled "Voice Architecture for Transmission Over a Shared, Contention Based Medium," by Gummalla et al., (SKGF 1875.0470001) (incorporated by reference in its entirety herein).

BACKGROUND OF THE INVENTION

1. Field of the Invention

The present invention is generally related to guaranteeing a delay jitter bound when scheduling bandwidth grants for voice calls via a communication medium.

2. Related Art

The importance to the modem economy of rapid data access and exchange cannot be overstated. This explains the exponentially increasing popularity of the data access and exchange via cable networks (including coaxial cable or Hybrid fiber coaxial cable), the Internet, intranets, wireless networks, satellites and so forth (i.e., communication mediums). Rapid data access and exchange is partly dependent upon how efficiently bandwidth is allocated to a data provider in order for the data provider to transfer the requested data to a user via one of the communication mediums mentioned above.

One very desirable solution for rapid data access and exchange is via cable networks and cable modems. Cable modems provide communications on cable networks. In general, a user connects a cable modem to the TV outlet for his or her cable TV, and the cable TV operator connects a cable modem termination system ("CMTS") in the operator's headend. The CMTS is a central device for connecting the cable network to a data network like the Internet. The CMTS is a central distribution point for a cable system. Data flows "downstream" from the CMTS to the cable modem (i.e., downstream communication). Alternatively, data flows "upstream" from the cable modem to the CMTS (i.e., upstream communication).

A common cable modem standard today is the Data Over Cable Service Interface Specification ("DOCSIS"). DOCSIS defines technical specifications for both cable modems and CMTS. DOCSIS downstream communication is quite restrictive in the way the control information is conveyed to the data provider (e.g., cable modem) via a DOCSIS CMTS scheduler. What is needed is to override the CMTS scheduler of DOCSIS and provide a scheduler that reduces the overhead of bandwidth grants via upstream and/or downstream communication by providing flexibility in the allocation of the bandwidth, while meeting the quality of service requirements of voice calls.

SUMMARY OF THE INVENTION

The scheduler of the invention strives to obtain high efficiency in transmission opportunities (e.g., granting bandwidth) to constant bit rate applications (e.g., voice calls), while meeting the quality of service requirements of constant bit rate applications. Voice data transmission has very stringent delay jitter bounds but it can tolerate a certain amount of delay jitter and latency. Thus, the scheduler makes use of this delay jitter and latency budget to increase the concatenation opportunities and in turn improve the overall system efficiency. The scheduler generates bandwidth grants with certain regularity but avoids the strong demand of an exact periodicity.

A method of the invention for guaranteeing a delay jitter bound when scheduling bandwidth grants to voice calls via a communication medium, includes the steps of: determining the delay jitter bound; based on the determined delay jitter bound, dividing a packetization frame period into phases; assigning a voice call to one of the phases; and scheduling a bandwidth grant to the voice call during the assigned phase, thereby guaranteeing the delay jitter bound.

A system of the invention for guaranteeing a delay jitter bound when scheduling bandwidth grants to voice calls via a communication medium, comprises a scheduler, wherein the scheduler determines the delay jitter bound, wherein the scheduler divides a packetization frame period into phases based on the determined delay jitter bound, wherein the scheduler assigns a voice call to one of the phases, and wherein the scheduler schedules a bandwidth grant to the voice call during the assigned phase, thereby guaranteeing the delay jitter bound.

A dejitter buffer of the invention implements a way to provide zero jitter service to an external system (e.g., the Internet), even though the packet transmission has jitter, by delaying the packet and thus converting jitter into delay.

BRIEF DESCRIPTION OF THE FIGURES

The present invention will be described with reference to the accompanying drawings, wherein.

DETAILED DESCRIPTION OF THE PREFERRED EMBODIMENTS

A. Overview of the Invention

The scheduler of the invention strives to obtain high efficiency in granting transmission opportunities (e.g., bandwidth) to constant bit rate data applications (e.g., voice calls), while meeting the quality of service requirements of constant bit rate data applications. Note that the present invention is described as a transmission opportunity being a bandwidth grant and as a constant bit rate application being a voice call. This is not meant to limit the invention.

Voice data transmission has very stringent delay jitter bounds but it can tolerate a certain amount of delay jitter and latency. Thus, the scheduler makes use of this delay jitter and latency budget to increase the concatenation opportunities and in turn improve the overall system efficiency. The scheduler also reduces fragmentation of grants which also improves the overall system efficiency. The scheduler generates bandwidth grants with certain regularity but avoids the strong demand of an exact periodicity, as will be described in more detail below.

For illustration purposes, the present invention is described in terms of being utilized with a cable network. It should be understood that the present invention is not limited to use with a cable network. In fact, the present invention may be used with any communication medium, including but not limited to, the Internet, intranets, fiber optic networks, wireless networks and satellites.

Data in the present invention includes any type of information. This includes, but is not limited to, digital, voice, video, audio, etc.

B. System Architecture Overview

Figure 1:
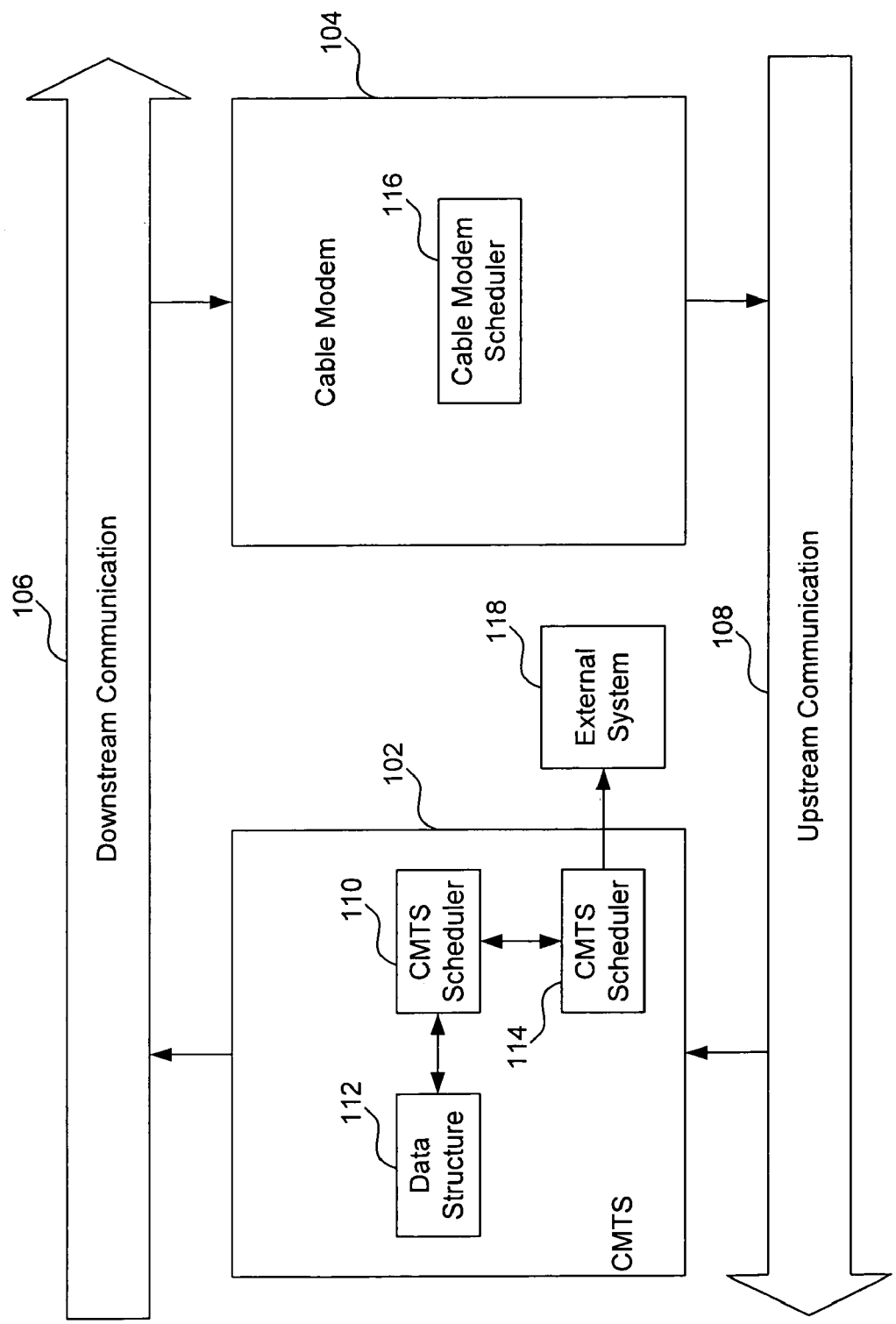
FIG. 1 is a block diagram representing an example operating environment of the present invention according to an embodiment.

FIG. 1 is a block diagram representing an example operating environment of the present invention. It should be understood that the example operating environment in FIG. 1 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 1, a CMTS 102, a cable modem 104, downstream communication 106 and upstream communication 108, are shown. CMTS 102 further includes a CMTS scheduler 110, a data structure 112, a dejitter buffer 114 and an external system 118. Cable modem 104 includes a cable modem scheduler 116. Each of these components will be briefly described next.

In general, cable modem 104 forwards or provides data via asynchronous communications on cable networks. Cable modem 104 receives data from a user that needs to be transferred via a cable network. In order to do this, cable modem 104 requests that CMTS 102 grant to it the necessary bandwidth.

As mentioned, cable modem 104 receives data from a user to be transferred via a cable network. Different types of data require different modes of transfer since the importance of timing is different with different types of data. For example, voice data cannot tolerate delays in its transfer. Alternatively, the type of data involved in file transfer can tolerate delays in its transfer.

In order to ensure the importance of timing is maintained, cable modem 104 assigns different priority identifiers to different types of data. The higher the priority data has, the less of a delay that type of data will experience in its transfer via the cable network. Thus, voice data would be assigned a priority identifier with a higher priority than data involved in file transfer. Also note that when voice data is involved CMTS 102 may automatically grant bandwidth to cable modem 104 though unsolicited grant service. Unsolicited grant service is described in more detail below.

Cable modem scheduler 116 is coupled to cable modem 104. In general, cable modem scheduler 116 is responsible for multiplexing the internal traffic, (i.e., requesting the necessary bandwidth that cable modem 104 needs to transfer its current types of data). Cable modem scheduler 116 must take into consideration the different priorities given to the current data to be transferred and to request bandwidth from CMTS 102 accordingly.

Cable modem scheduler 116 sends bandwidth requests to CMTS 102 via upstream communication 108. At a high level, each bandwidth request may include three fields. The three fields are a data provider identifier (e.g., cable modem identifier or CMID), a priority identifier, and the amount of required bandwidth. These three fields will be briefly described next.

Each cable modem 104 has a unique data provider identifier. CMTS 102 uses this identifier to grant the requested bandwidth to cable modem 104. Priority identifiers indicate the priority given to the data and thus indicate the type of data that will be transferred over the cable network via the granted bandwidth. In an embodiment, the present invention assigns voice data the highest priority, piggyback requests have the second highest priority and other types of data (including data required for file transfer) is given the lowest priority. Finally, the last field is a value indicating the amount of required bandwidth needed to transfer the data. CMTS 102, CMTS scheduler 110 and data structure 112 will now be described in more detail.

CMTS 102 is a central device for connecting the cable network to a data network. CMTS scheduler 110 is a bandwidth manager. CMTS scheduler 110, as a bandwidth manager, decides how to grant available bandwidth according to the current bandwidth requests. This grant is done by the invention via downstream communication 106 in such a way as to balance the reduction in overhead with the guaranteed bound on delay jitter for voice data scheduling. The details of how the present invention accomplishes this balance is described below in more detail.

Data structure 112 is used to organized the received bandwidth requests in such as way as to take into consideration the type of data (via the priority identifiers) and the order in which the requests were received. One way in which data structure 112 is populated is described in detail in U.S. patent Ser. No. 09/785,020.

Dejitter buffer 114 implements a way to provide zero jitter service to an external system 118 even though the packet transmission has jitter. One example of external system 118 is the Internet and applies when a user is browsing the Internet. Dejitter buffer 114 delays the packet before it transmits it to external system 118 to convert jitter into delay.

As stated above, DOCSIS is a common cable modem standard used today. The way in which the DOCSIS CMTS scheduler grants bandwidth is quite restrictive, thus creating unnecessary overhead in downstream communication. CMTS scheduler 110 defines an architecture that overrules the DOCSIS standard in a seamless manner. The details of how CMTS scheduler 110 grants bandwidth to cable modem 104 to decrease overhead will be described in detail below. The overhead in each granted bandwidth will be described next with reference to FIG. 2.

C. Granted Bandwidth Overhead

Figure 2:
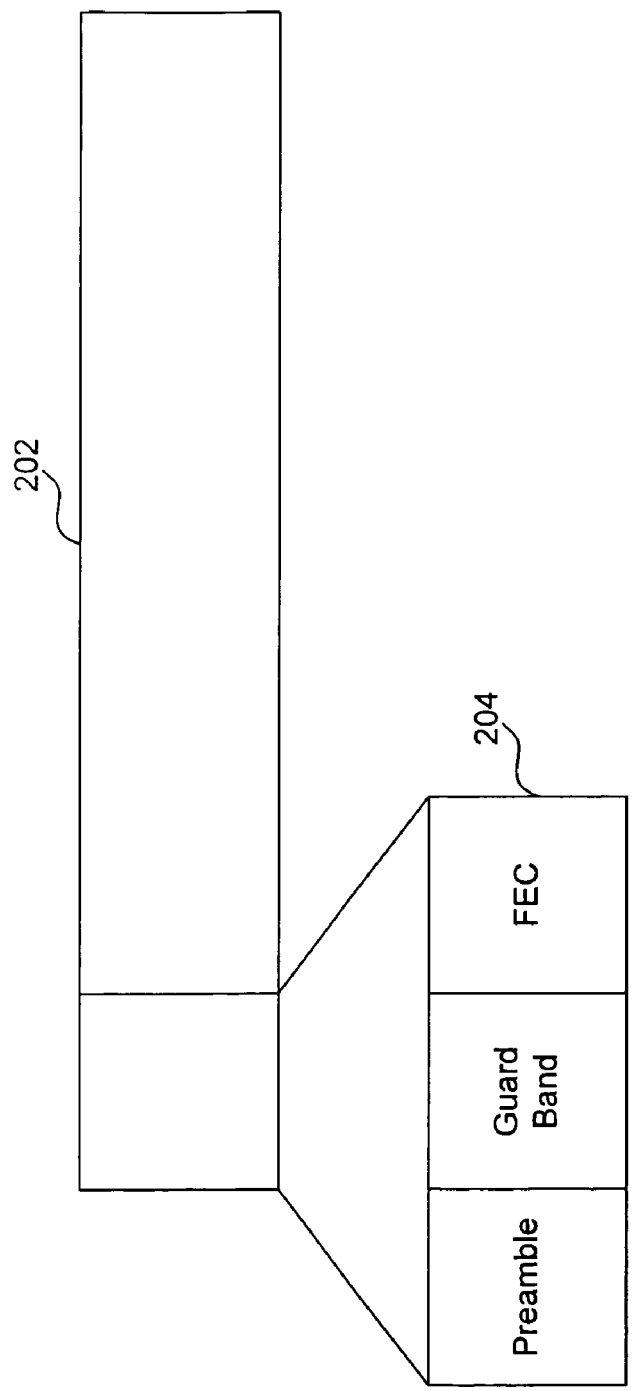
FIG. 2 illustrates an example of granted bandwidth according to an embodiment of the invention.

FIG. 2 illustrates an example of granted bandwidth 202. As shown, granted bandwidth shows overhead 204 including apreamble, a guard band and a forward error correction ("FEC"). Note that the location in granted bandwidth 202 of the preamble, the guard band and the FEC is not limited to what is shown in FIG. 2. The preamble is a pattern of bits transmitted at the start of a frame used to implement transmitter and receiver synchronization. The guard band is the time left vacant between adjacent transmissions to allow for detection certainty and clock synchronization inaccuracies in an asynchronous communication system. The FEC is the process whereby additional bits are appended to a block of bits so that the receiver will be able to both detect and correct transmission errors.

Overhead 204 may be referred to as the physical layer overhead. Different systems may reserve different amounts of bytes for overhead 204. Regardless of the size of granted bandwidth 202, overhead 204 uses approximately the same amount of bytes. Where the preamble and guard band are typically fixed in size, the FEC is a variable size that depends on the amount of bandwidth. Therefore, the larger the granted bandwidth, the greater the efficiency. However, larger granted bandwidths mean greater delay jitter experienced by a voice call, for example. Thus, when granting bandwidth, delay jitter versus gained efficiency must be taken into consideration.

How the present invention concatenates bandwidth requests from the same cable modem 104 to create a single data burst bandwidth is described next.

D. Concatenation of Bandwidth Grants

As mentioned above, cable modem scheduler 116 may send different bandwidth requests to CMTS 102, including but not limited to, voice, piggyback and data for activities such as file transfer. Thus, at any given time, CMTS 102 may have more than one request for the same cable modem 104 (i.e., the same cable modem identifier). This is especially true since cable modem scheduler 104 piggybacks requests as often as possible. These requests may have different priority identifiers values or the same priority identifier value for data that has arrived at CMTS 102 at different times.

CMTS scheduler 110 concatenates all pending bandwidth grants from the same cable modem 104 into one data burst bandwidth grant or packetization interval, thereby reducing the physical layer overhead to increase efficiency. Here, instead of individual requests being granted which would require physical layer overhead for each grant, the present invention reduces the physical layer overhead to one for all of the individual requests by combining them. This can be accomplished partly because there is a decoupling of the request phase (i.e., bandwidth requests from cable modem 104) with the grant phase (i.e., grants of bandwidth received from CMTS 102).

As mentioned above, the concatenation of bandwidth to increase efficiency is likely to increase the delay jitter experienced by a voice call. CMTS scheduler 110 needs to take into consideration delay jitter verses the gained efficiency.

Figure 3:
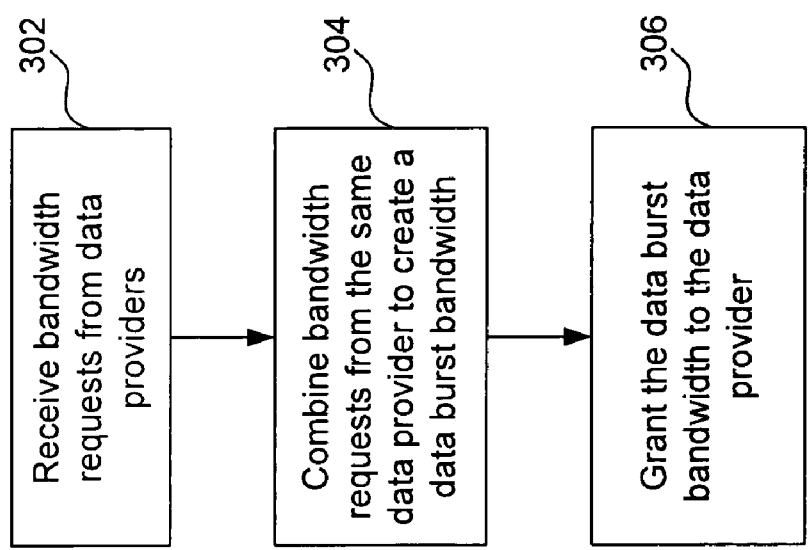
FIG. 3 is a high level flowchart that describes the process of combining bandwidth requests to create a data burst bandwidth according to an embodiment of the present invention.

FIG. 3 is a high level flowchart that describes the process of combining bandwidth requests to create a data burst bandwidth according to an embodiment of the present invention.

In FIG. 3, control starts at step 302. In step 302, CMTS 102 receives one or more bandwidth requests from one or more cable modems 104 via upstream communication 108. Control then passes to step 304.

In step 304, CMTS scheduler 110 concatenates one or more bandwidth requests from the same cable modem 104 to create a single data burst bandwidth. One way to concatenate the requests is to schedule the requests to be serviced based on priority identifiers (i.e., type of data) and the order in which the requests for bandwidth were received. In an embodiment, CMTS scheduler 110 is implemented as a priority first-come first-served scheduler. Another possible way to concatenate the requests to be serviced is based on various quality of service parameters. Quality of service parameters include efficiency of transmission and transfer delay tolerance. As stated above, different types of data require different modes of transfer since the importance of timing is different with different types of data. For example, voice data cannot tolerate delays in its transfer. Alternatively, the type of data involved in file transfer can tolerate delays in its transfer. Control then passes to step 306.

In step 306, CMTS 102 grants the data burst bandwidth to the appropriate cable modem 104 via downstream communication 106. The flowchart in FIG. 3 ends at this point. Unsolicited grant service may be used by the invention when scheduling voice data and is described next.

E. Unsolicited Grant Service

When voice data is involved, CMTS 102 automatically grants bandwidth to cable modem 104. One reason for this automatic grant of bandwidth is that voice data cannot tolerate delays in its transfer. Therefore, since constant voice data is so deterministic (i.e., constant bit rate), CMTS 102 can generate bandwidth grants at a certain periodicity without the need of bandwidth requests from the data provider (e.g., cable modem 104). This service is referred to as unsolicited grant service in DOCSIS.

Packetized voice generates a fixed size packet at deterministic instants. This means that cable modem 104 requires an upstream transmission opportunity at regular intervals of time. The periodicity depends on packetization of voice. One example that is not meant to limit the present invention is when G.711 PCM voice generates a byte of data every 125 microsecs or 64 Kbps. If these bytes are accumulated into 10 ms packets, the packet size would be 80 bytes of data. Therefore, every 10 ms cable modem 104 will need enough upstream bandwidth to transmit 80 bytes of data.

In order to increase the efficiency of providing bandwidth for voice data to cable modem 104, silence during a voice call may be suppressed (this may be referred to as support of voice with activity detection). In general, in any conversation only one of the persons is speaking at a given instant. Therefore, during a conversation only one half of the circuit is needed at any given time. Typically, one side of the conversation is active for only 40% of the time. In fact, significant bandwidth savings are achieved by not transmitting any data during the silence periods and instead playing out background noise (i.e., comfort noise) at the other end. Here, once a silent period is detected during a voice call then the unsolicited grant service is deactivated.

Cable modem 104 signals for a reduction in its bandwidth requirements at the beginning of silence periods and an increase when the silence periods end. One example of how to indicate the beginning of a silence period is to set a silence bit when a voice call becomes silent. CMTS 102 stops the unsolicited grant service on receiving a voice packet with the silence bit set. Another way to indicate the beginning of a silence period is to implement an inactivity timer. Here, if the number of unused unsolicited grants is above a threshold then CMTS 102 stops the unsolicited grants and starts providing a poll. A way to indicate the end of a silence period is for cable modem 104 to send CMTS 102 an additional bandwidth request.

When the use of unsolicited grant service and data burst bandwidths are used together, a certain amount of delay jitter is produced. The amount of delay jitter is increased when voice activity detection is used. Delay jitter is described next.

F. Delay Jitter

Voice calls supported by the same (or other) cable modem 104 come and go independently one from another. When voice activity detection is used, the silence and active periods of different calls also occur independently. Hence, the number of voice calls active at a given time can frequently change. When bandwidth grants for different voice calls are concatenated together, the bandwidth grant size varies accordingly to the frequent change in the number of active voice calls. Two ways in which a voice call may become inactive, which is not meant to limit the invention, is when the voice call ends or becomes silent. Thus, the transmission time of a given active voice call may be at the beginning of the bandwidth grant in some frames and at the end of the bandwidth grant in other frames, as illustrated by FIG. 4.

Figure 4:
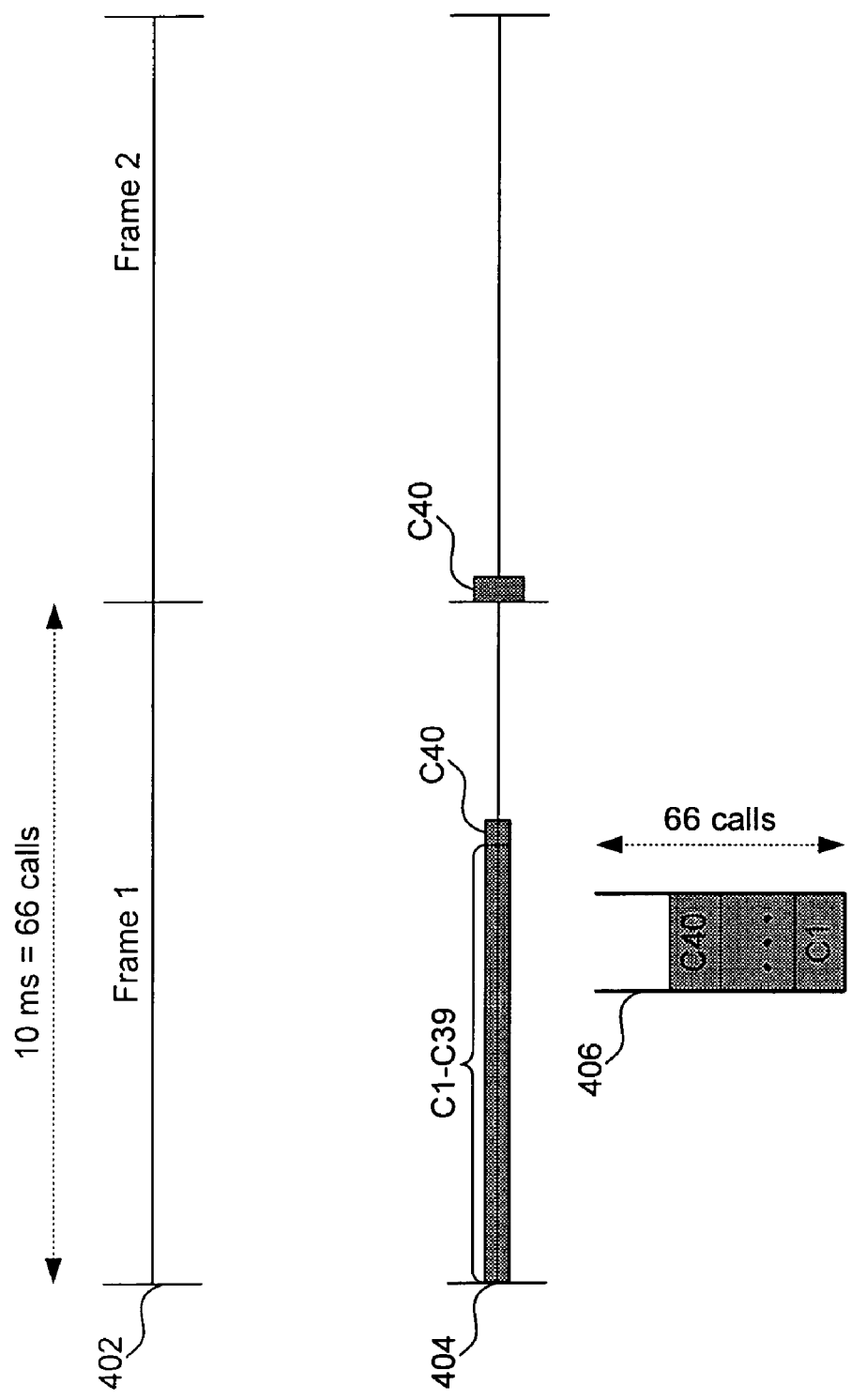
FIG. 4 illustrates an example non-phase packetization interval scheduling algorithm.

The bandwidth scheduling algorithm illustrated in FIG. 4 illustrates a non-phase packetization interval scheduling algorithm 402. As shown in FIG. 4, algorithm 402 uses two frames (frame 1 and frame 2) in which bandwidth grants may be issued. For illustration purposes only, it is assumed that a cable network has a 2.56 Mbps upstream capacity, 16-byte mini-slot size (i.e., 200 mini-slots frame size), and 20 bytes of overhead per packet. Further assumed is that all voice calls to be supported are 16 kbps with a 10 ms packetization interval. If all calls belong to a different cable modem 104, the cable network can support a maximum of sixty-six voice calls. Note that if more than one voice call belongs to the same cable modem 104, then these voice calls can be concatenated to save physical layer overhead. In this situation the number of voice calls that can be supported would be higher.

According to algorithm 402, as long as each voice call is active it receives a bandwidth grant in each frame. A voice call is considered inactive if it has gone silent or it has finished. An example of possible delay jitter bound of algorithm 402 is described next with reference to algorithm 404 and list 406.

Scheduling algorithm 404 also represents a non-phase packetization interval scheduling algorithm. List 406 may be stored in data structure 112 (FIG. 1) and maintains a list of currently admitted voice calls up to a maximum of 66 calls. In this example, list 406 currently contains forty calls labeled C1 through C40. Therefore, a delay jitter equal of sixty-five calls is possible.

With algorithm 404, it is assumed that forty voice calls have been admitted by CMTS scheduler 110. Further assume that in frame 1 all forty voice calls are active and therefore granted bandwidth. Here, in frame 1 the bandwidth grant for the last call C40 is sent in the 40th position. Further assume that in frame 2, the first 39 calls (C1–C39) become inactive (i.e., either finish or go silent). This leaves the last call C40 as the only active voice call in frame 2. Therefore, the bandwidth grant for C40 in frame 2 is sent in the first position. This results in a delay jitter equal to forty calls. Note that if the maximum calls allowed were admitted by CMTS scheduler 110, then list 406 would consist of sixty-six calls. In this case, the delay jitter bound would be sixty-five calls.

In general with the non-phase scheduling algorithm described in FIG. 4, the maximum delay jitter a call could suffer is equal to the packetization interval minus one. The present invention limits this concatenation delay jitter to a given value by limiting the number of voice calls that are concatenated in the same bandwidth grant transmission. In order to do this, the invention utilizes a phase-based scheduling algorithm that is described in detail below with reference to FIG. 5. Here, if more calls need to be supported then calls can be grouped in separate grants assigned to the same cable modem 104. In this case though, the system efficiency is slightly comprised (as compared to one large bandwidth burst grant) for a better delay jitter bound. What the present invention provides is voice scheduling that allows for the concatenation of voice calls in a single grant transmission (i.e., increase in efficiency), but also guarantees a delay jitter bound on the voice transmission by breaking each frame into multiple phases. In general, CMTS scheduler 110 of the invention generates bandwidth grants with certain regularity but avoids the strong demand of an exact periodicity via a phase-based algorithm. The phase-based algorithm 502 of the invention is described next with reference to FIG. 5.

Figure 5:
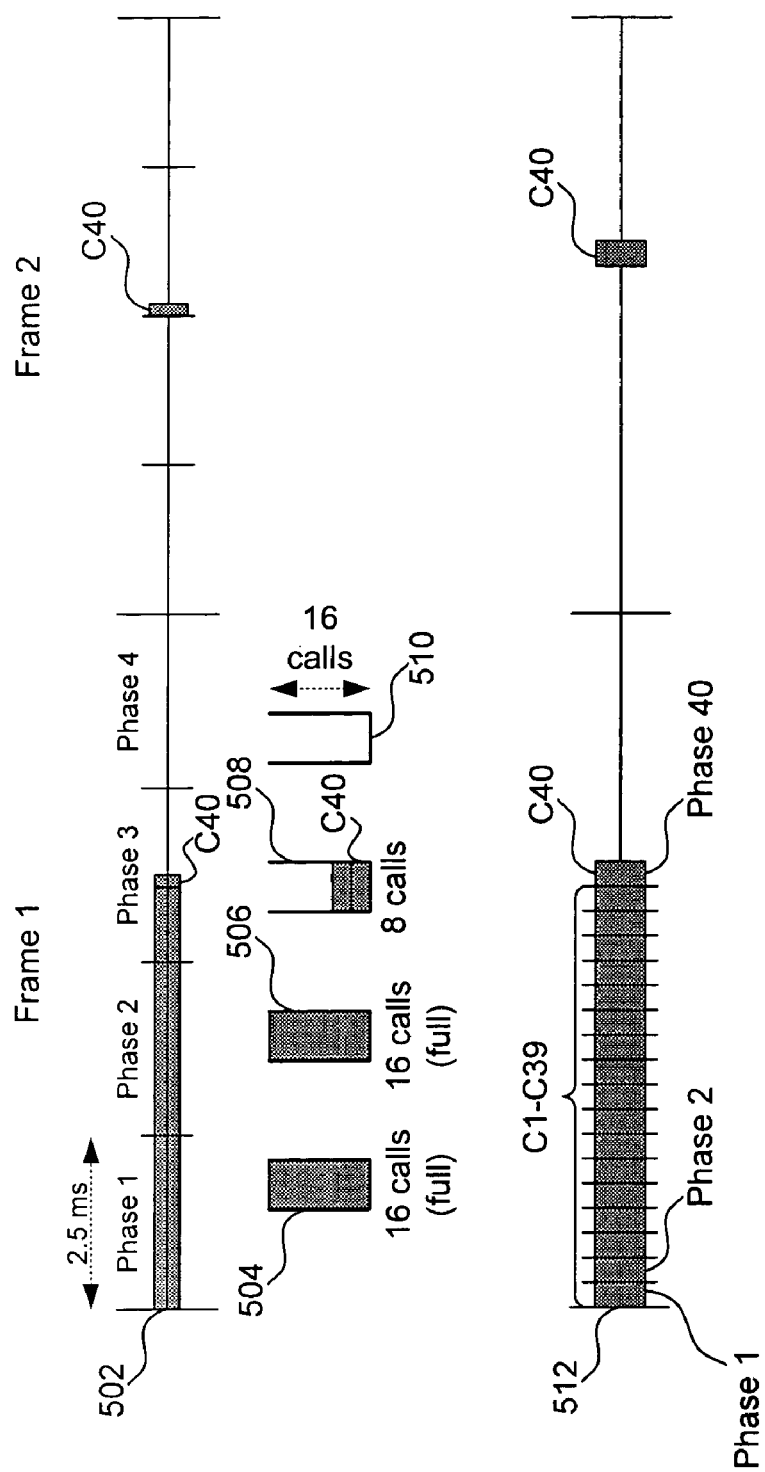
FIG. 5 further illustrates the example non-phase packetization interval scheduling algorithm of FIG. 4.

FIG. 5 illustrates how the delay jitter bound can be limited if the number of calls admitted is controlled with sub-lists, where each sub-list controls a separate part of the frame (i.e., separate sub-frame or phase). An example, not meant to limit the invention, is to assume that the desired delay jitter bound is equal to 2.5 ms. In this example the frame is divided into four phases (phase 1 through phase 4). Note that the present invention is not limited to the phases being divided equally. The duration of the phase corresponds to the maximum delay jitter bound. Thus, the number of phases depends on the stringency of the delay jitter bound.

Each frame has a separate list of calls belonging to its respective phase. As shown, list 504 represents the admitted calls for phase 1, list 506 represents the admitted calls for phase 2, list 508 represents the admitted calls for phase 3 and list 510 represents the admitted calls for phase 4. Each phase can support up to sixteen calls. This means that the maximum grant size is sixteen calls and thus a voice call can suffer a delay jitter of up to fifteen calls (i.e., the delay jitter bound is fifteen calls).

Calls are admitted based on a policy into phases. Several examples of policies, that is not meant to limit the invention, is to admit calls based on a priority first-come first-served basis, admit calls based on various quality of service parameters, and so forth. In this example the last call C40 is admitted in phase 3. As above in FIG. 4, all forty voice calls are active and are granted bandwidth in frame 1. Here, the last call C40 is granted bandwidth in frame 1 in the fourth position of the bandwidth burst in phase 3. In frame 2 calls 1 through 39 finish or go silent (become inactive). The only call not finished in frame 2 is the last admitted call C40. Here, C40 is served at the beginning of phase 3 in frame 2 (i.e., C40 is granted bandwidth in frame 2 in the first position of the bandwidth burst for phase 3). This equals a delay jitter of seven calls. Thus the maximum delay jitter in phase-based scheduling algorithm 502 is a maximum of fifteen calls instead of a maximum of sixty-five calls as illustrated in non-phase scheduling algorithm 402/404 (FIG. 4). Although, the complexity of phase-based scheduling algorithm 502 is more complex than non-phase scheduling algorithm 402/404 described above with reference to FIG. 4.

If phase-based scheduling algorithm 502 is generalized, then non-phase scheduling algorithm 402 illustrates a phase-based scheduling algorithm where the phase size is set equal to its maximum (i.e., the packetization interval). Note that the complexity increases if the voice calls have different packetization intervals. In FIG. 5, algorithm 512 shows the other extreme of the selection of the phase size where the phase size is equal to its minimum value, a single call. Here, each frame period is divided into 66 phases. Thus, C1 is assigned to phase 1, C2 is assigned to phase 2, and so forth, until C40 is assigned to phase 40. In this example, the last call C40 is served exactly the same time in frame 1 and frame 2. Therefore the maximum delay jitter in phase-based algorithm 512 is a maximum of zero.

It is important to note that the phase-based scheduling algorithm does not necessarily guarantee an exact time in which the grants for a given call arrive. Here, only a certain regularity specified by the delay jitter bound is specified. The packetization process must guarantee that the packet is always ready when the grant arrives. A minimum delay synchronization mechanism must guarantee that the packetization process generates the periodic packets so that they wait in the queue or list the minimum amount of time just to buffer this uncertainty of the grant arrival. Individual phases of a frame may be further divided into sub-phases, as described next with reference to FIG. 10.

Figure 10:
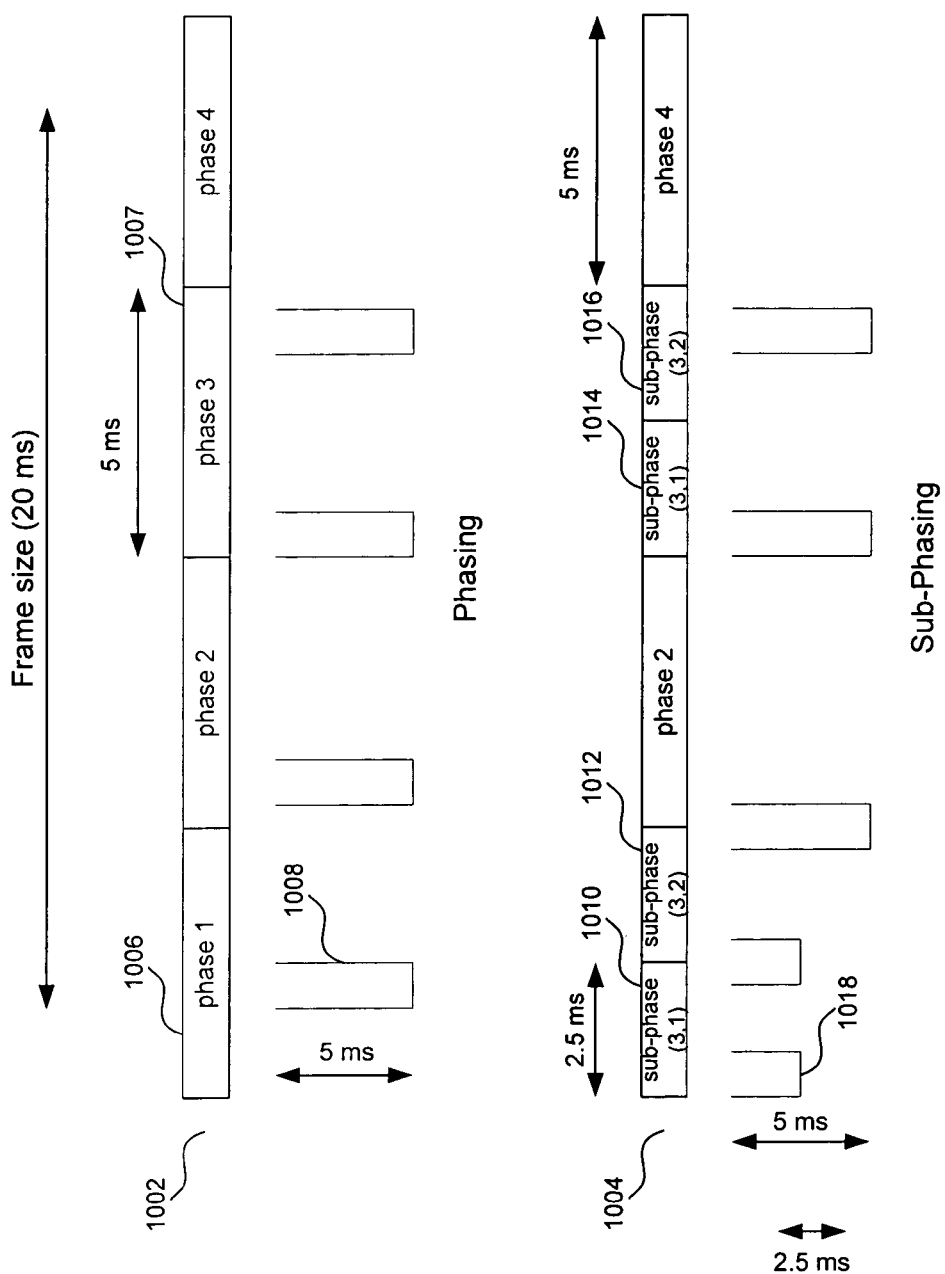
FIG. 10 illustrates a sub-phase-based algorithm of the present invention according to an embodiment.

In FIG. 10, a phase-based algorithm 1002 and a sub-phase-based algorithm 1004 are shown. Phase-based algorithm 1002 is similar to what was described above. Here, the frame size is 20 ms. The frame is divided into four phases, each 5 ms in size. Each phase has a queue of the same size associated with it. For example, queue 1008 is 5 ms in size and is associated with phase 1 1006 (also 5 ms in size). Sub-phase-based algorithm 1004 illustrates phase 1 1006 as being farther phased into sub-phase (1, 1) 1010 and sub-phase (1, 2) 1012 and phase 3 1007 being further phased into sub-phase (3, 1) 1014 and sub-phase (3, 2) 1016. Here, sub-phase (1, 1) 1010, sub-phase (1, 2) 1012, sub-phase (3, 1) 1014 and sub-phase (3, 2) 1016 are 2.5 ms in size. Likewise, their respective queues are also 2.5 ms in size. For example, queue 1018 is 2.5 ms in size and it is associated with sub-phase (1, 1) 1010. The calls serviced in sub-phases 1010, 1012, 1014 and 1016 will have a lower jitter bound than in the other 5 ms phases. This principle can be further extended to divide sub-phases. The implementation of CMTS scheduler 110 incorporating the phase-based algorithm of the invention is described next.

G. Implementation of CMTS Scheduler

Figure 6:
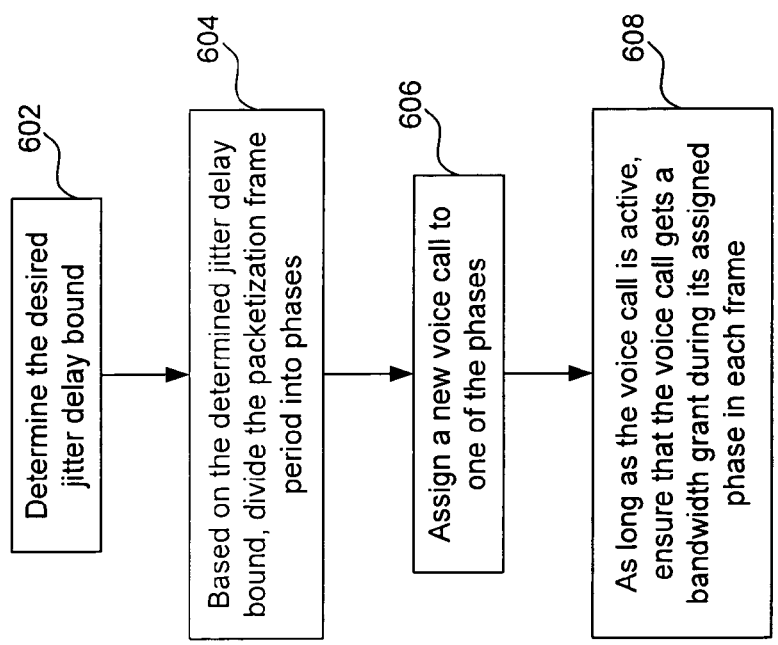
FIG. 6 illustrates the high level operation of the scheduler of the invention according to an embodiment.

CMTS scheduler 110 strives to obtain high efficiency in granting bandwidth to voice calls, while meeting the quality of service requirements of voice calls. Voice data transmission has very stringent delay jitter bounds but it can tolerate a certain amount of delay jitter and latency. Thus, CMTS scheduler 110 makes use of this delay jitter and latency budget to increase the concatenation opportunities and in turn improve the overall system efficiency. As stated above, CMTS scheduler 110 of the present invention generates bandwidth grants with certain regularity but avoids the strong demand of an exact periodicity. FIG. 6 illustrates the method in which this is accomplished by CMTS scheduler 110.

In FIG. 6, the flow starts at step 602. In step 602, CMTS scheduler 110 determines the desired delay jitter bound. When determining the desired delay jitter bound such things as the quality of service requirements for a voice call, and so forth, are taken into consideration. The duration of the phase corresponds to the maximum delay jitter bound. Thus, the number of phases depends on the stringency of the delay jitter bounds. Here, as the stringency increases so does the number of phases. Control then passes to step 604.

In step 604, based on the determined delay jitter bound the packetization frame period is divided into several sub-frames or phases, as described in detail in U.S. patent Ser. No. 09/785,020. Here, the frame can be divided into equal sized phases. Alternatively, the phases may be different sizes. Control then passes to step 606.

In step 606, a new voice call is assigned to one of the phases, as described in detail in U.S. patent Ser. No. 09/785,020. This is typically done based on some type of policy. Control then passes to step 608.

In step 608, as long as the voice call is active, CMTS scheduler 110 ensures that the voice call gets a bandwidth grant during its assigned phase. The flowchart in FIG. 6 ends at this point.

Each voice call in the cable network can potentially operate with a different number of phases. A zero delay jitter service can be achieved when the phase size is set to one slot. Here, the grant comes with an exact periodicity.

Figure 7:
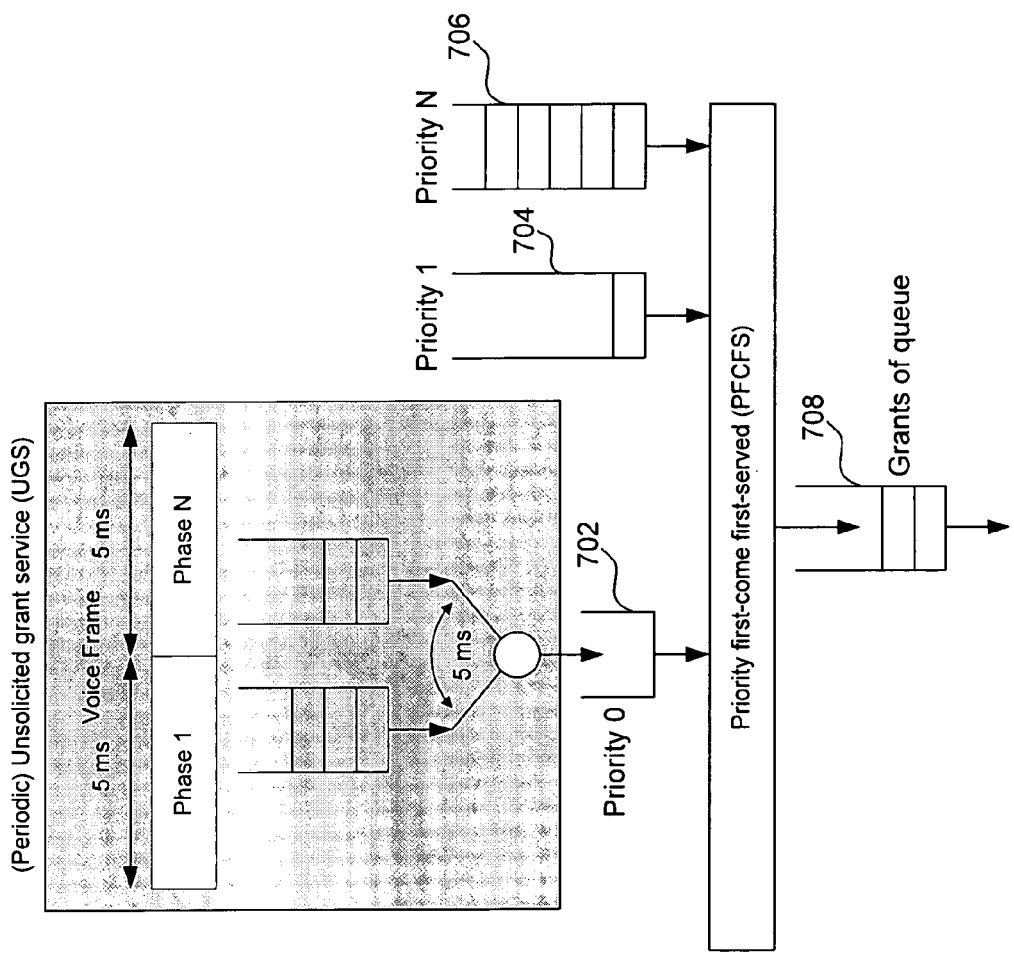
FIG. 7 illustrates the scheduler of the invention as being implemented as a priority first-come first-served scheduler while incorporating the phase-based scheduling algorithm according to an embodiment of the present invention.

As stated above, CMTS scheduler 110 may be implemented as a priority firstcome first-served scheduler. FIG. 7 illustrates CMTS scheduler 110 being implemented as a priority first-come first-served scheduler while incorporating the phase-based scheduling algorithm described above. As mentioned above, in order to ensure the importance of timing is maintained, cable modem 104 assigns different priority identifiers to different types of data. The higher the priority data has, the less of a delay that type of data will experience in its transfer via the cable network. Thus, voice data would be assigned a priority identifier with a higher priority than data involved in file transfer.

In FIG. 7, requests are classified in several queues, one for each priority level. Assume that the highest priority (priority 0) queue 702 is reserved for voice data. the second highest priority (priority 1) queue 704 is reserved for TCP/IP requests and the lowest priority (priority N) queue 706 is reserved for file transfer. In other systems, the highest priority may be given to another type of data. Also shown in FIG. 7 is a bandwidth grants queue 708. The various queues drain into grants queue 708 based on a priority first-come first-served ordering.

Voice data queue 702 is fed by the unsolicited grant service. In fact, the unsolicited grant service filters and controls so much the draining process of the voice data queue that it is actually not necessary. It is just a symbolic queue that helps represent that the voice data has higher priority once it passes the unsolicited grant service. In FIG. 7, at the beginning of the time phase the voice bandwidth grants of the particular phase are generated. The unsolicited grant service keeps track of the time to generate the next voice region and which phase to fill it in. One way of scheduling bandwidth for packets that support different types of traffic is done via a switch, input queues and output queues. This is described next with reference to FIG. 11.

Figure 11:
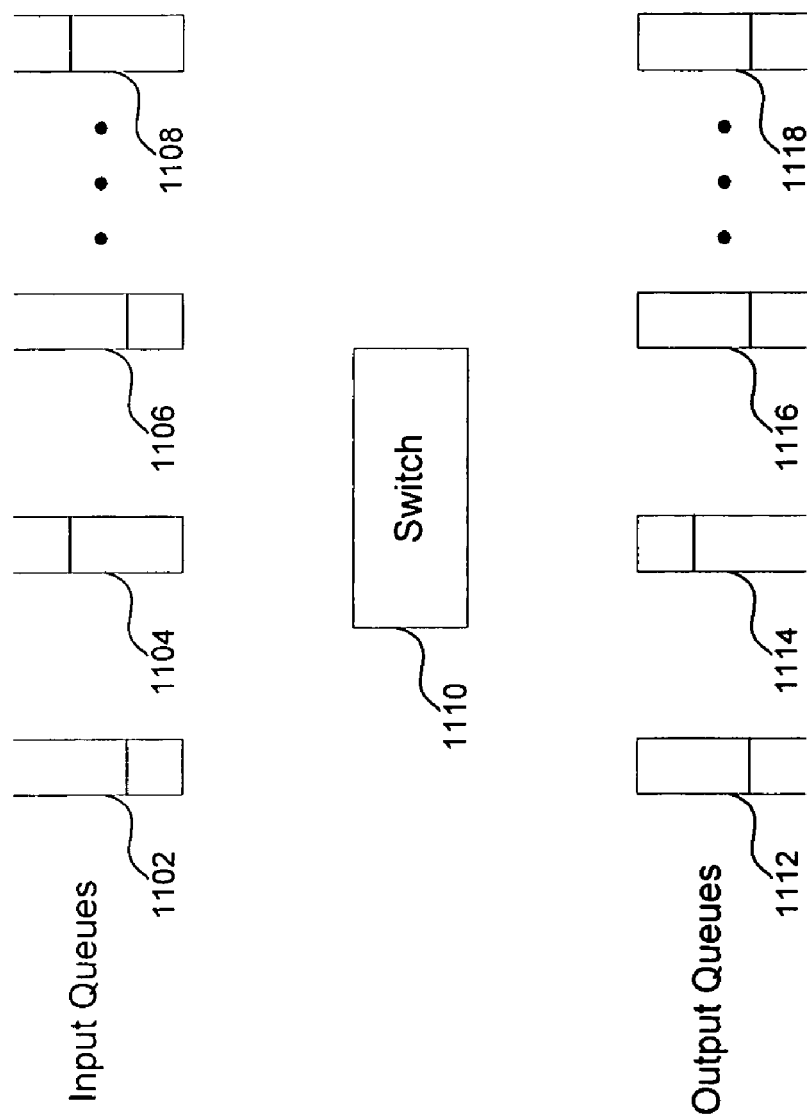
FIG. 11 illustrates one way of scheduling bandwidth for packets that support different types of traffic as done via switch, input queues and output queues according to an embodiment of the invention.

In FIG. 11, packets are stored in a plurality of input queues 1102 through 1108. A switch 1110 knows the current status of input queues 1102 through 1108 (i.e., the number of packets stored in each queue and each corresponding packet's data or traffic type). Switch 1110 may use the algorithms described above with reference to CMTS scheduler 110 when quality of service parameters are used to determine which packets in input queues 1102 through 1108 get moved to output queues 1112 through 1118. The other way in which the present invention guarantees the delay jitter bounds for voice data by interrupting the non-voice data region when a voice data region must start is described next.

H. Fragmentation Resulting in the Interruption of the Non-Voice Data Region

Figure 8:
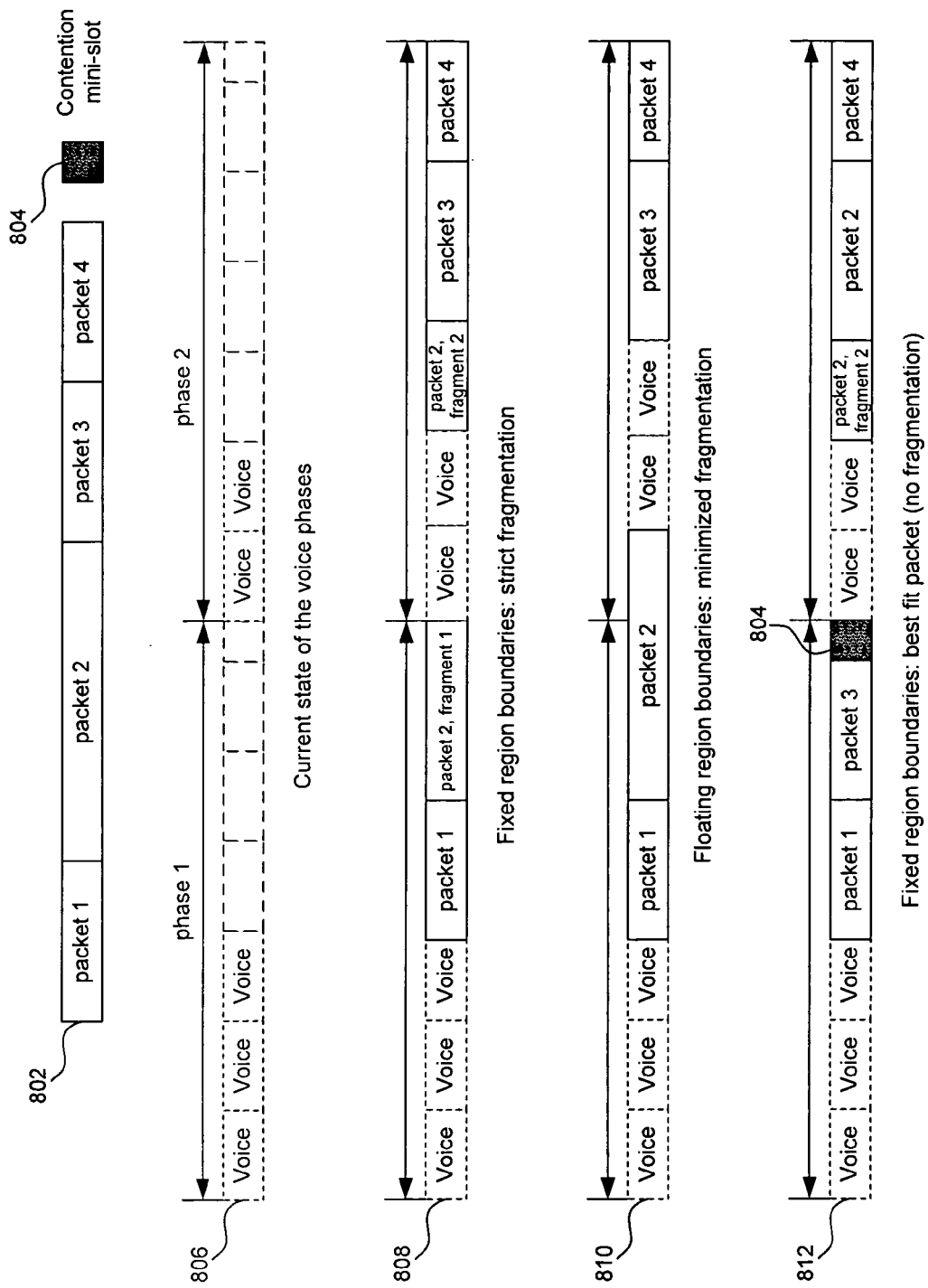
FIG. 8 illustrates various fragmentation policies according to an embodiment of the present invention.

The invention only imposes fragmentation of grants to guarantee the delay jitter bounds of voice data. The fragmentation of grants results from the non-voice data region being interrupted when a voice region must start. However, the invention attempts to minimize the fragmentation, as will be illustrated with reference to FIG. 8. In FIG. 8 a non-voice packet queue 802 is shown with four packets of different sizes, including packet 1, packet 2, packet 3 and packet 4. An example of a non-voice packet is file transfer data. Also included in FIG. 8 is a contention mini-slot 804.

A current state of the voice phases 806 includes three voice calls in phase 1 and two voice calls in phase 2. Following are examples of three different alternatives to service the non-voice packets in queue 802. The different alternatives include a fixed region boundaries and strict fragmentation 808, a floating region boundaries and minimized fragmentation 810 and a fixed region boundaries and best fit packet (no fragmentation) 812.

With fixed region boundaries and strict fragmentation 808, it is assumed that the voice grant region boundaries are fixed and CMTS scheduler 110 serves the nonvoice packets in strict order. As shown, packet 2 must be fragmented in two pieces since it does not fit in the non-voice grant region remaining in phase 1.

Floating region boundaries and minimized fragmentation 810 assumes some flexibility on where the voice grant region starts. Since the phases are not fully reserved the voice grants can be delayed a bit and still fit inside the phase boundaries, as shown in phase 2. Since packet 2 is small enough to meet this condition, CMTS scheduler 110 generates the entire grant for packet 2 and then starts the voice grant region. Note that even in this scenario fragmentation is not always avoided. Here, a non-voice packet will need to be fragmented if its size is longer than the available bandwidth for best effort data in the voice grant region in the next phase. When the next voice phase is full, then the probability that the non-voice packet is fragmented is greater. This is a reason for trying to fill the voice phases as uniformly as possible.

Finally, in fixed region boundaries and best fit packet (no fragmentation) 812 if the next non-voice packet in order is too big to fit in the remainder of the current phase, then CMTS scheduler 110 can grant the first non-voice packet that does fit. If no such non-voice packet exists then CMTS scheduler 110 can assign with one or more of contention mini-slot 804. Note that for simplicity above, fixed region boundaries and strict fragmentation 808 and floating region boundaries and minimized fragmentation 810 were not shown with a detailed slot allocation with contention mini-slots 804. The use of contention mini-slots 804 requires the additional processing to search for non-voice packets that fit in the gap that is available. If the head non-voice packet is a large sized packet, the invention cannot leave all gap for contention. This involves added processing that is not required by fixed region boundaries and strict fragmentation 808 and floating region boundaries and minimized fragmentation 810. Another way in which the invention decreases the delay jitter bound that involves alternating the voice and non-voice data grants from one phase to another is described next with reference to FIG. 13.

As described above with reference to FIG. 8, fragmentation of non-voice data grants may be used to guarantee the delay jitter bounds of voice data. In FIG. 8, for each phase, voice data is allocated grants first and then non-voice data is allocated grants until either the phase ends or all of the necessary grants have been allocated. The fragmentation of grants results from the non-voice data region being interrupted when a voice region must start in the next phase. The present invention interrupts the non-voice data grants less often by allocating in one phase voice data grants first and then non-voice data grants, and in the next phase alternating the order of grant allocation by allocating non-voice data grants and then voice data grants. This is possible since it is known at the start of each phase the amount of voice data grants that are necessary for each phase. An example that is not meant to limit the invention is described next with reference to FIG. 13.

Figure 13:
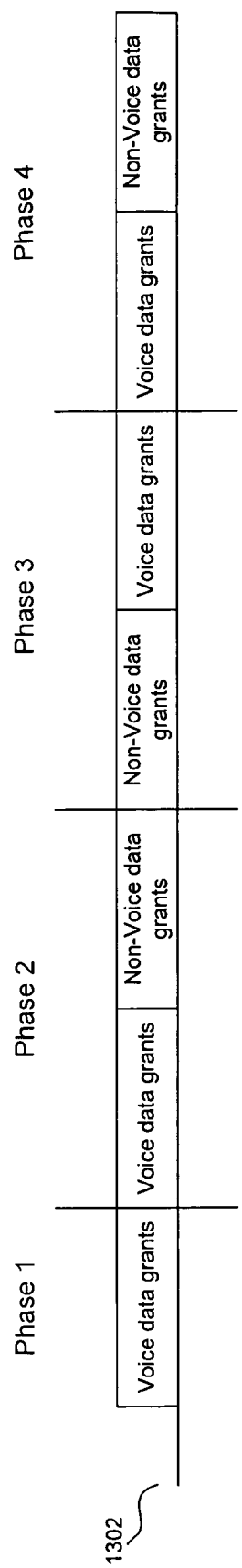
FIG. 13 illustrates decreasing the delay jitter bound by alternating the voice and non-voice data grants from one phase to another.

In FIG. 13, a time line 1302 shows four phases. In phase 1, CMTS scheduler 110 determines the size of the total voice grants to be allocated and starts allocating the grants so that it finishes at the end of phase 1 (i.e., a fixed boundary). In phase 2, CMTS scheduler 110 starts allocating voice data grants at the beginning of the phase (i.e., the same fixed boundary) until finished and then starts allocating the non-voice data grants. The non-voice data grants are then carried immediately into phase 3 until CMTS scheduler 110 must start the voice data grants. Likewise, voice data grants are carried immediately into phase 4, followed by non-voice data grants. Here, if the contiguous set of voice data grants is measured from the fixed boundary out then possible delay jitter bound is halved. Likewise, if the contiguous set of non-voice data grants is measured from the fixed boundary (i.e., immediately goes into the following phase) then fragmentation of non-voice data grants may be reduced since the non-voice region is not interrupted to start a voice region at the beginning of the following phase. How the present invention provide zero delay jitter to a voice call via dejitter buffer 114 is described next.

I. Dejitter Buffer

Figure 12:
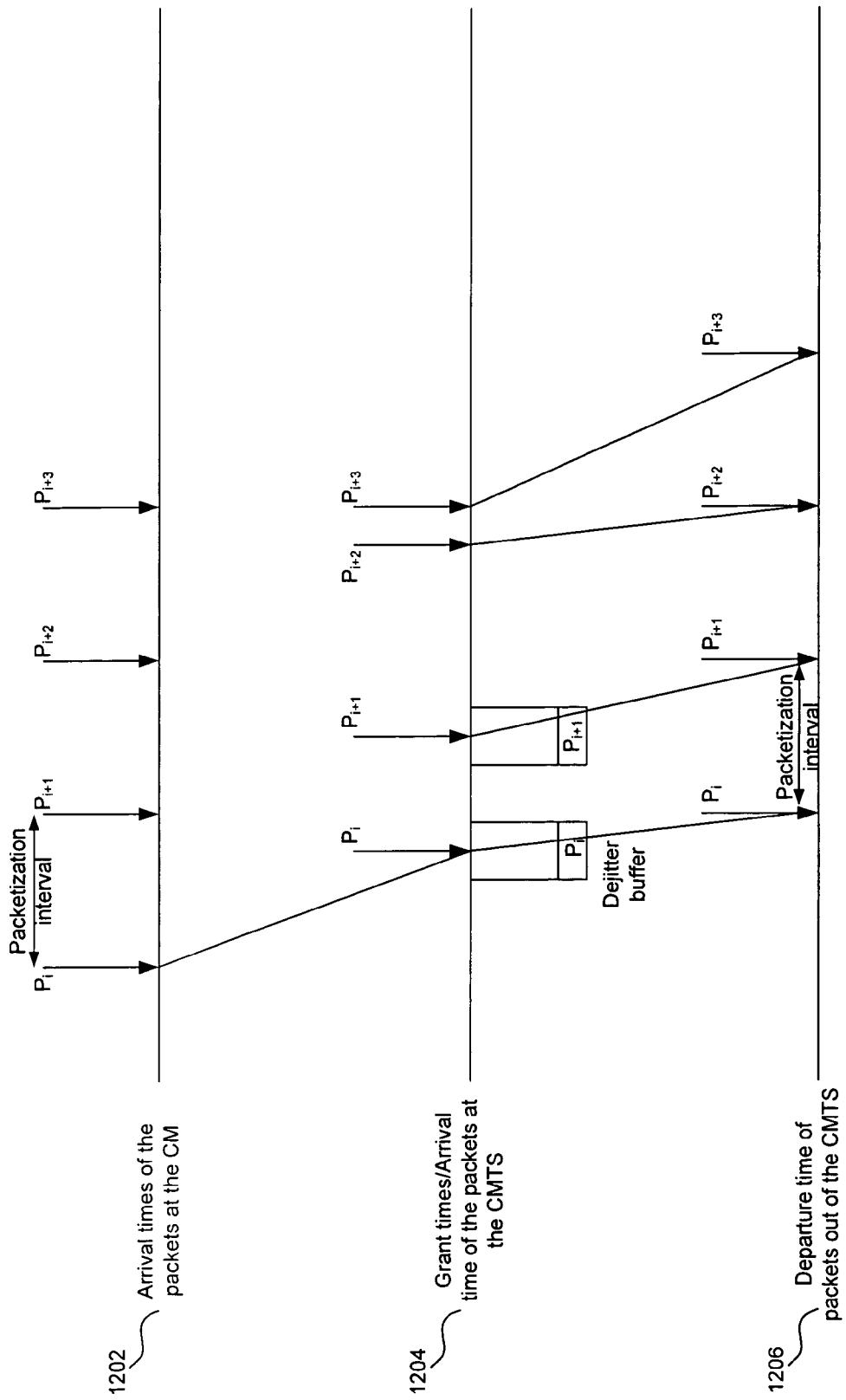
FIG. 12 illustrates the operation of the dejitter buffer according to an embodiment of the invention.

Dejitter buffer 114 implements a way to provide zero delay jitter service even though the packet transmission has jitter. Dejitter buffer 114 delays the packet before it transmits it to external system 118 to convert jitter into delay. One example of external system 118 is the Internet and applies when a user is browsing the Internet. How zero delay jitter service is accomplished by the invention is illustrated with reference to FIG. 12. FIG. 12 illustrates three time lines 1202, 1204 and 1206. Time line 1202 illustrates the arrival times of packets (Pi through Pi+3) for an application at cable modem 104. As shown in time line 1202, the packets Pi through Pi+3 arrive at cable modem 104 in equal time increments or packetization intervals. Next, time line 1204 illustrates the grant times/arrival time of packets Pi through Pi+3 at CMTS 102. Due to jitter on the cable network, the packets Pi through Pi+3 are not granted bandwidth by CMTS scheduler 110 in equal time increments, as shown in time line 1204. Thus, to guarantee zero jitter to the application one or more of dejitter buffers 114 are used to delay the packet transmission out of CMTS 102 to external system 118 such that the time increments of packetization intervals are the same as in time line 1202. This is illustrated in time line 1206. In essence, dejitter buffer 114 delays the departure of packets Pi through Pi+3 from CMTS 102 to external system 118 and thereby converts jitter to delay to guarantee zero delay jitter. An example environment of the invention is described next.

J. Example Environment of the Present Invention

Figure 9:
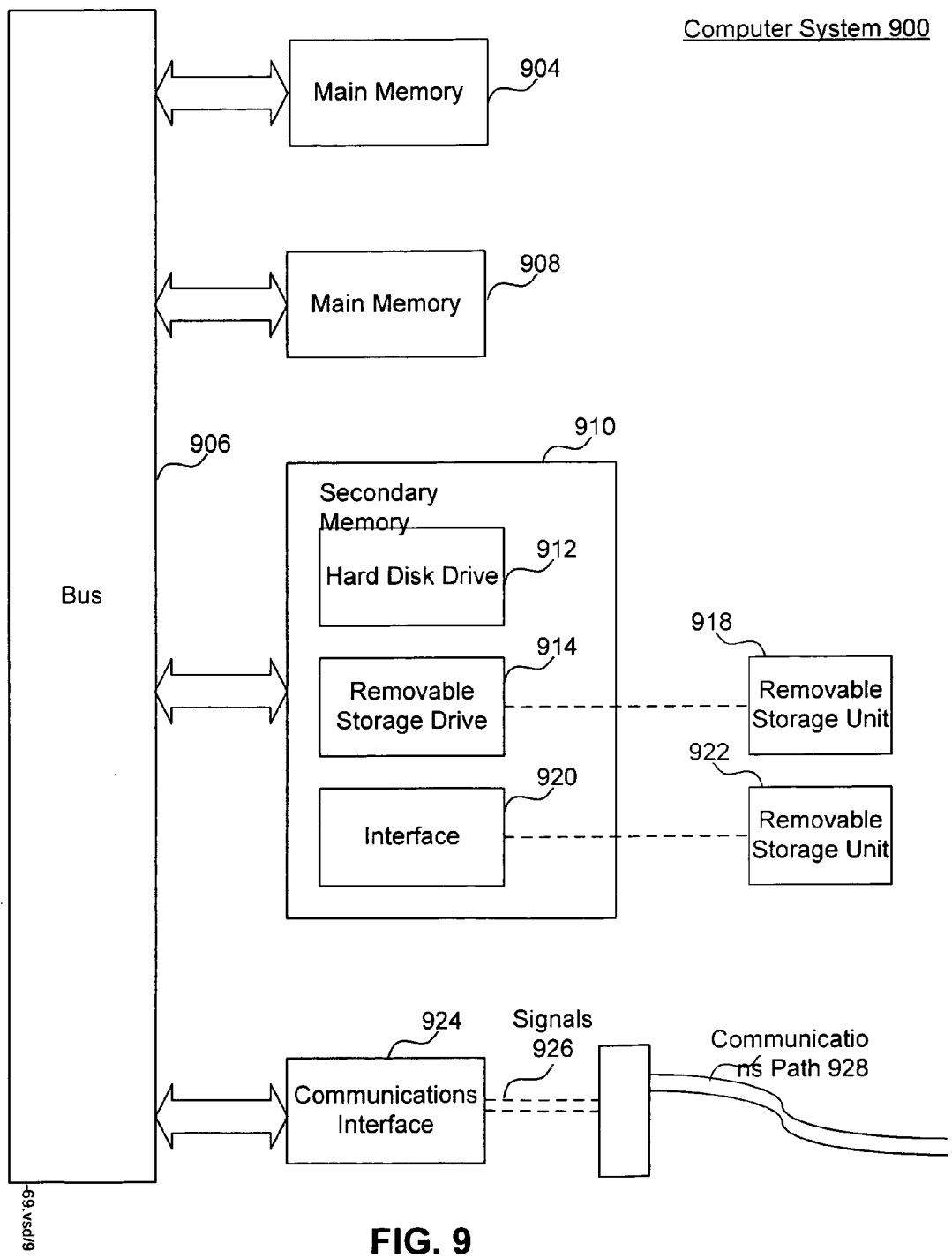
FIG. 9 is a block diagram illustrating how CMTS, CMTS scheduler, and cable modem scheduler may be implemented according to an embodiment of the invention.

CMTS 102, CMTS scheduler 110 and cable modem scheduler 116 may be implemented using computer 900 as shown in FIG. 9. Obviously, more than one of these functional components could be implemented on a single computer 900.

The present invention may be implemented using hardware, software or a combination thereof and may be implemented in a computer system or other processing system. In fact, in one embodiment, the invention is directed toward one or more computer systems capable of carrying out the functionality described herein. The computer system 900 includes one or more processors, such as processor 904. The processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 918 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCM-CIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and signals 926. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software maybe stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

K. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method for guaranteeing a delay jitter bound when scheduling transmission opportunities to constant bit rate data applications via a communication medium, including the steps of:
   determining the delay jitter bound;
   based on said determined delay jitter bound, dividing a packetization frame period into two or more phases wherein the total duration of each of the phases substantially, equal the maximum delay jitter bound;
   assigning a constant bit rate data application to one of said phases and scheduling a transmission opportunity to said constant bit rate data application during said assigned phase, thereby guaranteeing the delay jitter bound.

2. The method of claim 1, wherein said transmission opportunity is a bandwidth grant and said constant bit rate application is a voice call.

3. The method of claim 2, wherein said step of scheduling includes the steps of:
determining whether said voice call is active; and
granting bandwidth to said voice call only when said voice call is active.

4. The method of claim 3, wherein said step of scheduling further includes the step of granting bandwidth to non-voice data according to a fragmentation policy.

5. The method of claim 4, wherein said fragmentation policy is a floating region boundaries and minimized fragmentation policy.

6. The method of claim 2, further including the step of:
alternating the order of the grant of bandwidth to said voice call and non-voice data in adjacent phases of said one or more phases.

7. The method of claim 1, wherein the communication medium is a cable network.

8. The method of claim 1, wherein the communication medium is a wireless network.

9. The method of claim 1, wherein the communication medium is the Internet.

10. The method of claim 1, wherein the communication medium is a satellite network.

11. The method of claim 1, wherein the communication medium is a fiber optic network.

12. The method of claim 1, wherein one or more of said phases is further divided into sub-phases.

13. The method of claim 2, further comprising the step of:
delaying the transmission of said bandwidth grant to ensure a zero delay jitter bound.

14. A system for guaranteeing a delay jitter bound when scheduling transmission opportunities to constant bit rate data applications via a communication medium, comprising:
a scheduler, wherein said scheduler determines the delay jitter bound, wherein said scheduler divides a packetization frame period into two or more phases based on said determined delay jitter bound wherein the total duration of each of the phases substantially equal the maximum delay jitter bound, wherein said scheduler assigns a constant bit rate data application to one of said phases, and wherein said scheduler schedules a transmission opportunity to said constant bit rate data application during said assigned phase, thereby guaranteeing the delay jitter bound.

15. The system of claim 14, wherein said transmission opportunity is a bandwidth grant and said constant bit rate application is a voice call.

16. The system of claim 15, wherein said scheduler determines whether said voice call is active, and wherein said scheduler grants bandwidth to said voice call only when said voice call is active.

17. The system of claim 16, wherein said scheduler grants bandwidth to non-voice data according to a fragmentation policy.

18. The system of claim 17, wherein said fragmentation policy is a floating region boundaries and minimized fragmentation policy.

19. The system of claim 15, wherein one or more of said phases is further divided into sub-phases.

20. The system of claim 14, wherein the communication medium is a cable network.

21. The system of claim 14, wherein the communication medium is a wireless network.

22. The system of claim 14, wherein the communication medium is the Internet.

23. The system of claim 14, wherein the communication medium is a satellite network.

24. The system of claim 14, wherein the communication medium is a fiber optic network.

25. The system of claim 14, wherein said scheduler is implemented as a priority first-come first-served scheduler.

26. The system of claim 14, wherein said scheduler is applied in a switch implementation.

27. The system of claim 14, further comprising:
a dejitter buffer for delaying the transmission of a packet to an external system to ensure a zero delay jitter bound.

28. The system of claim 14, wherein said external system is the Internet.

29. The system of claim 15, wherein said scheduler alternates the order of the grant of bandwidth to said voice call and non-voice data in adjacent phases of said one or more phases.

30. A method for guaranteeing a delay jitter bound when scheduling transmission opportunities to constant bit rate data applications via a communication medium, including the steps of:
determining the delay jitter bound;
based on said determined delay jitter bound, dividing a packetization frame period into one or more phases wherein the total duration of each of the phases substantially equal the maximum delay jitter bound;
assigning a voice call to one of said phases; and
scheduling a bandwidth grant to said voice call during said assigned phase, thereby guaranteeing the delay jitter bound, said scheduling step including determining whether said voice call is active;
granting bandwidth to said voice call only when said voice call is active; and
granting bandwidth to non-voice data according to a fixed region boundaries and strict fragmentation policy.

31. A method for guaranteeing a delay jitter bound when scheduling transmission opportunities to constant bit rate data applications via a communication medium, including the steps of:
determining the delay jitter bound;
based on said determined delay jitter bound, dividing a packetization frame period into one or more phases wherein the total duration of each of the phases substantially equal the maximum delay jitter bound;
assigning a voice call to one of said phases; and
scheduling a bandwidth grant to said voice call during said assigned phase, thereby guaranteeing the delay jitter bound, said scheduling step including determining whether said voice call is active;
granting bandwidth to said voice call only when said voice call is active; and
granting bandwidth to non-voice data according to a fixed region boundaries and best fit packet policy.

32. A system for guaranteeing a delay jitter bound when scheduling a bandwidth grant to a voice call via a communication medium, comprising a scheduler, wherein said scheduler:
determines the delay jitter bound, divides a packetization frame period into one or more phases based on said determined delay jitter bound wherein the total duration of each of the phases substantially equal the maximum delay jitter bound,
assigns a voice call to one of said phases, schedules a bandwidth grant to said voice call during said assigned phase, thereby guaranteeing the delay jitter bound, determines whether said voice call is active;

grants bandwidth to said voice call only when said voice call is active, and grants bandwidth to non-voice data according to a fixed region boundaries and strict fragmentation policy.

33. A system for guaranteeing a delay jitter bound when scheduling a bandwidth grant to a voice call via a communication medium, comprising a scheduler, wherein said scheduler:

determines the delay jitter bound, divides a packetization frame period into one or more phases based on said determined delay jitter bound wherein the total duration of each of the phases substantially equal the maximum delay jitter bound, assigns a voice call to one of said phases, schedules a bandwidth grant to said voice call during said assigned phase, thereby guaranteeing the delay jitter bound, determines whether said voice call is active;

grants bandwidth to said voice call only when said voice call is active, and grants bandwidth to non-voice data according to a fixed region boundaries and best fit packet policy.

* * * * *

UNITED STATES PATENT AND TRADEMARK OFFICE
CERTIFICATE OF CORRECTION

| | | |
|---|---|---|
| PATENT NO. | : 7,106,744 B2 | |
| APPLICATION NO. | : 10/046725 | |
| DATED | : September 12, 2006 | |
| INVENTOR(S) | : Gummalla et al. | |

It is certified that error appears in the above-identified patent and that said Letters Patent is hereby corrected as shown below:

- In column 14, line 62, "substantially, equal" should be replaced with --substantially equal--.

- In column 16, line 15, "system of claim 14," should be replaced with --system of claim 27,--.

Signed and Sealed this

Third Day of July, 2007

JON W. DUDAS
*Director of the United States Patent and Trademark Office*